(12) United States Patent
Yamashita

(10) Patent No.: US 9,290,176 B2
(45) Date of Patent: Mar. 22, 2016

(54) DRIVING-TORQUE DISTRIBUTION CONTROL APPARATUS OF FOUR-WHEEL DRIVE VEHICLE

(71) Applicant: MAZDA MOTOR CORPORATION, Hiroshima (JP)

(72) Inventor: Shinichirou Yamashita, Aki-gun (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/713,988

(22) Filed: May 15, 2015

(65) Prior Publication Data

US 2016/0023654 A1 Jan. 28, 2016

(30) Foreign Application Priority Data

Jul. 23, 2014 (JP) ................................ 2014-149871

(51) Int. Cl.
| | | |
|---|---|---|
| *B60W 30/18* | (2012.01) | |
| *B60W 30/045* | (2012.01) | |
| *B60W 10/16* | (2012.01) | |
| *B60W 10/119* | (2012.01) | |
| *B60W 10/04* | (2006.01) | |
| *B60W 40/109* | (2012.01) | |

(52) U.S. Cl.
CPC ............. *B60W 30/045* (2013.01); *B60W 10/04* (2013.01); *B60W 10/119* (2013.01); *B60W 10/16* (2013.01); *B60W 30/18145* (2013.01); *B60W 40/109* (2013.01); *B60W 2520/125* (2013.01); *B60W 2720/40* (2013.01); *B60W 2720/403* (2013.01)

(58) Field of Classification Search
None
See application file for complete search history.

(56) References Cited

U.S. PATENT DOCUMENTS

| | | | | |
|---|---|---|---|---|
| 5,388,046 | A | * 2/1995 | Anan et al. | ............. B60K 28/16 180/197 |
| 5,734,595 | A | * 3/1998 | Matsuno | ............. B60K 23/0808 180/197 |
| 5,752,211 | A | 5/1998 | Takasaki et al. | |
| 5,894,904 | A | 4/1999 | Yakou et al. | |
| 2006/0037802 | A1 | * 2/2006 | Mori | ..................... B60K 23/04 180/233 |
| 2009/0204284 | A1 | * 8/2009 | Nakajima et al. | ....... B60L 15/20 701/31.4 |
| 2013/0035832 | A1 | 2/2013 | Nozu et al. | |

* cited by examiner

Primary Examiner — Justin Holmes
(74) Attorney, Agent, or Firm — Studebaker & Brackett PC

(57) ABSTRACT

A controller to control a driving-torque distribution to a front wheel and a rear wheel comprises an obtainment portion to obtain a vehicle's lateral acceleration, an engine's output torque, and a vehicle's turning radius during turning of a vehicle, a determination portion to determine a rear-wheel driving-torque distribution rate denoting a rate of the driving torque to be transmitted to the rear wheel relative to the driving torque corresponding to the engine's output torque based on the obtained vehicle's lateral acceleration, engine's output torque, and vehicle's turning radius, and a control-signal output portion to output a control signal to a driving-torque transmission device to adjust the driving torque transmitted to the rear wheel such that the driving torque to be distributed to the rear wheel is controlled according to the determined rear-wheel driving-torque distribution rate.

9 Claims, 4 Drawing Sheets

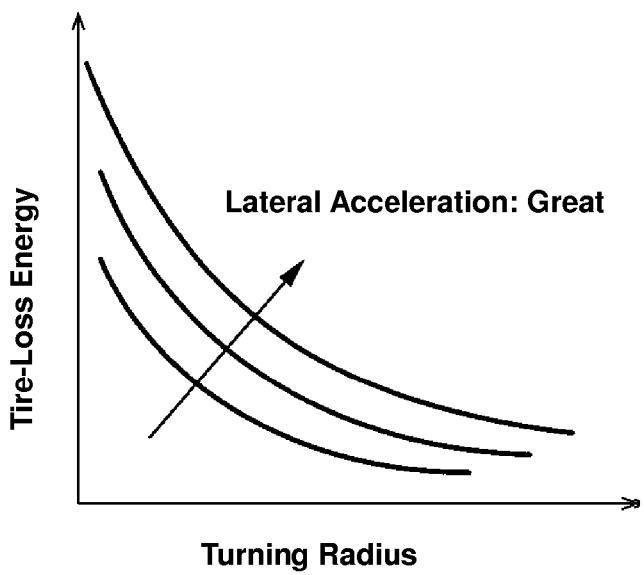
FIG. 5A
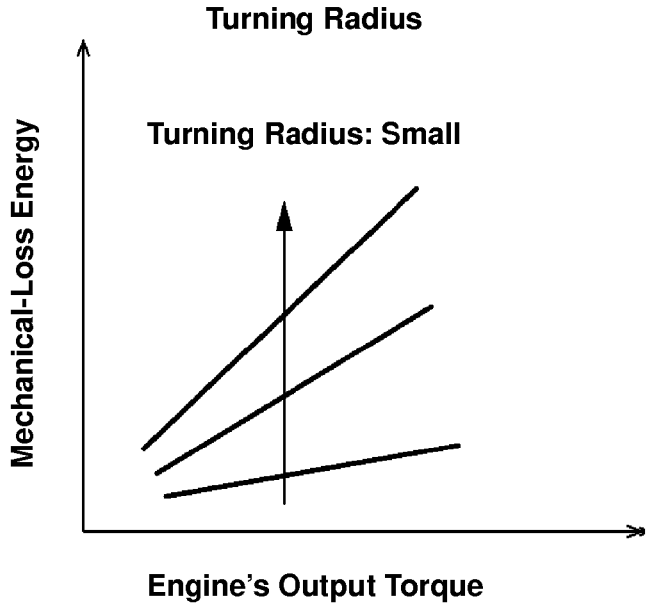
FIG. 5B
FIG. 6

DRIVING-TORQUE DISTRIBUTION CONTROL APPARATUS OF FOUR-WHEEL DRIVE VEHICLE

BACKGROUND OF THE INVENTION

The present invention relates to a driving-torque distribution control apparatus of a four-wheel drive vehicle, and in particular relates to the driving-torque distribution control apparatus of the four-wheel drive vehicle which controls a driving torque distributed to a rear wheel of the vehicle.

Conventionally, various technologies of controlling the driving torque distributed to an auxiliary driving wheel (the rear wheel, typically) have been proposed. U.S. Pat. No. 5,752,211, for example, proposes a technology that the fuel economy (gas millage) is improved by decreasing the driving torque distributed to the auxiliary driving wheel during steady traveling of the vehicle. U.S. Pat. No. 5,894,904, for example, proposes another technology that increasing of the traveling resistance of the vehicle is avoided by decreasing the driving torque distributed to the rear wheel according to an increase of a speed difference between left and right rear wheels because of a decrease of a vehicle's turning radius. US Patent Application Publication No. 2013/0035832 A1, for example, proposes further another technology that in a specified rotational-speed range of an engine's output shaft in which some noise is possibly generated at a driving-torque transmission system because of pulsation of the driving torque, the driving torque to be transmitted to the auxiliary driving wheel is set at a torque value capable of decreasing the above-described noise properly.

In the meantime, a gripping limit of a vehicle's tire is generally indicated by a friction circle having the ordinate representing a force acting on the tire in a longitudinal direction and the abscissa representing a force acting on the tire in a lateral direction. In a conventional four-wheel drive vehicle, the driving torque was controlled such that the forces on the friction circle act on the both front-and-left wheels, putting emphasis on improvements of the vehicle's movement performance, traveling performance, and the like. That is, in the conventional four-wheel drive vehicle, the driving torque to be distributed to the rear wheel was controlled so that both tires of the front and rear wheels can be used at the gripping limit, thereby making the maximum longitudinal and lateral forces acting on the tires during the vehicle's traveling. However, the above-described conventional control has a tendency that the traveling resistance of the whole vehicle including the front and rear wheels during the turning does not become the minimum, more specifically, that the total sum of loss energy of tire-loss energy and mechanism-loss energy during the vehicle's turning does not become the minimum. That is, the conventional control is not configured such that the driving torque distributed to the rear wheel is controlled so as to minimize the total sum of the loss energy during the vehicle's turning.

SUMMARY OF THE INVENTION

The present invention has been devised in view of the above-described matter, and an object of the present invention is to provide a driving-torque distribution control apparatus of a four-wheel drive vehicle which can properly control the driving torque distributed to the rear wheel such that the total sum of the loss energy during the vehicle's turning becomes the minimum.

The present invention is a driving-torque distribution control apparatus of a four-wheel drive vehicle, which comprises a controller and a driving-torque transmission device to adjust a driving torque transmitted to a rear wheel according to a control signal of the controller, thereby controlling a driving-torque distribution of front and rear wheels of the vehicle, wherein the controller is configured to obtain a lateral acceleration generated at the vehicle, an engine's output torque, and a vehicle's turning radius during turning of the vehicle, determine a rear-wheel driving-torque distribution rate which denotes a rate of the driving torque to be transmitted to the rear wheel relative to the driving torque corresponding to the engine's output torque based on the obtained vehicle's lateral acceleration, engine's output torque, and vehicle's turning radius, and output the control signal to the driving-torque transmission device such that the driving torque to be distributed to the rear wheel is controlled according to the determined rear-wheel driving-torque distribution rate.

According to the present invention, since the rear-wheel driving-torque distribution rate is determined based on the lateral acceleration, the engine's output torque, and the vehicle's turning radius, which may have an influence on the total sum of the sum of tire-loss energy of the front and rear wheels and the mechanism-loss energy during the vehicle's turning, the driving torque distributed to the rear wheel can be properly controlled, taking the total sum of the energy into consideration. Thereby, the total sum of the loss energy of the sum of the tire-loss energy of the front and rear wheels and the mechanical-loss energy can be properly improved.

In an embodiment of the present invention, the controller determines the rear-wheel driving-torque distribution rate based on the above-described obtained vehicle's lateral acceleration, engine's output torque, and vehicle's turning radius such that the total sum of loss energy of the sum of tire-loss energy of the front and rear wheels and mechanism-loss energy caused by driving of the rear wheel becomes the minimum. According to this embodiment, the driving torque distributed to the rear wheel is properly controlled so that the total sum of the loss energy of the sum of the tire-loss energy of the front and rear wheels and the mechanical-loss energy during the vehicle's turning can be minimized.

In another embodiment of the present invention, the controller determines the rear-wheel driving-torque distribution rate such that the greater the obtained vehicle's lateral acceleration is, the larger the rear-wheel driving-torque distribution rate is. According to this embodiment, the rear-wheel driving-torque distribution rate can be properly determined based on the vehicle's lateral acceleration having the influence on the total sum of the loss energy (the greater the vehicle's lateral acceleration is, the larger the total sum of the loss energy is) so as to improve the total sum of the loss energy.

In another embodiment of the present invention, the controller determines the rear-wheel driving-torque distribution rate such that the greater the obtained engine's output torque is, the larger the rear-wheel driving-torque distribution rate is. According to this embodiment, the rear-wheel driving-torque distribution rate can be properly determined based on the engine's output torque having the influence on the total sum of the loss energy (the greater the engine's output torque is, the larger the total sum of the loss energy is) so as to improve the total sum of the loss energy.

In another embodiment of the present invention, the controller determines the rear-wheel driving-torque distribution rate such that the greater the obtained vehicle's turning radius is, the smaller the rear-wheel driving-torque distribution rate is. According to this embodiment, the rear-wheel driving-torque distribution rate can be properly determined based on the vehicle's lateral acceleration having the influence on the total sum of the loss energy (the greater the vehicle's turning radius is, the larger the total sum of the loss energy is) so as to improve the total sum of the loss energy.

In another embodiment of the present invention, the controller may determine the rear-wheel driving-torque distribution rate based on a map which previously associates the rear-wheel driving-torque distribution rate to be set with a value which is calculated by multiplying the lateral acceleration, the engine's output torque, and the reciprocal of the vehicle's turning radius, wherein the rear-wheel driving-torque distribution rate determined by the controller is configured to correspond to the value calculated by multiplying the obtained lateral acceleration, the obtained engine's output torque, and the reciprocal of the obtained vehicle's turning radius.

In further another embodiment of the present invention, the controller may determine the rear-wheel driving-torque distribution rate based on a map which previously associates the rear-wheel driving-torque distribution rate to be set with a combination of the lateral acceleration, the engine's output torque, and the vehicle's turning radius, wherein the rear-wheel driving-torque distribution rate determined by the controller is configured to correspond to the combination of the obtained lateral acceleration, the obtained engine's output torque, and the obtained vehicle's turning radius.

In further another embodiment of the present invention, the driving-torque transmission device may be configured to vary a maximum transmission driving torque which is the maximum of the driving torque transmitted to the rear wheel, and the controller may obtain the maximum transmission driving torque based on the rear-wheel driving-torque distribution rate and set the obtained maximum transmission driving torque for the driving-torque transmission device.

Other features, aspects, and advantages of the present invention will become apparent from the following description which refers to the accompanying drawings.

BRIEF DESCRIPTION OF THE DRAWINGS

FIG. 4A showing a case in which the rear-wheel driving-torque distribution rate is 0%; FIG. 4B showing a case in which the rear-wheel driving-torque distribution rate is 35%; and FIG. 4C showing a case in which the rear-wheel driving-torque distribution rate is 50%.

FIGS. 5A and 5B show characteristics of loss energy; FIG. 5A showing tire loss-energy characteristics according to a vehicle's turning radius and a lateral acceleration generated at the vehicle; and FIG. 5B showing mechanical-loss energy characteristics according to an engine's output torque and the vehicle's turning radius.

FIG. 6 shows an example of a map for determining the rear-wheel driving-torque distribution rate according to the embodiment of the present invention.

DETAILED DESCRIPTION OF THE INVENTION

Hereafter, a driving-torque distribution control apparatus of a four-wheel drive vehicle according to an embodiment of the present invention will be described.

[Apparatus Structure]

First, an entire structure of a vehicle to which the driving-torque distribution control apparatus of a four-wheel drive vehicle according to the embodiment of the present invention is applied will be described referring to FIG. 1.

Figure 1:
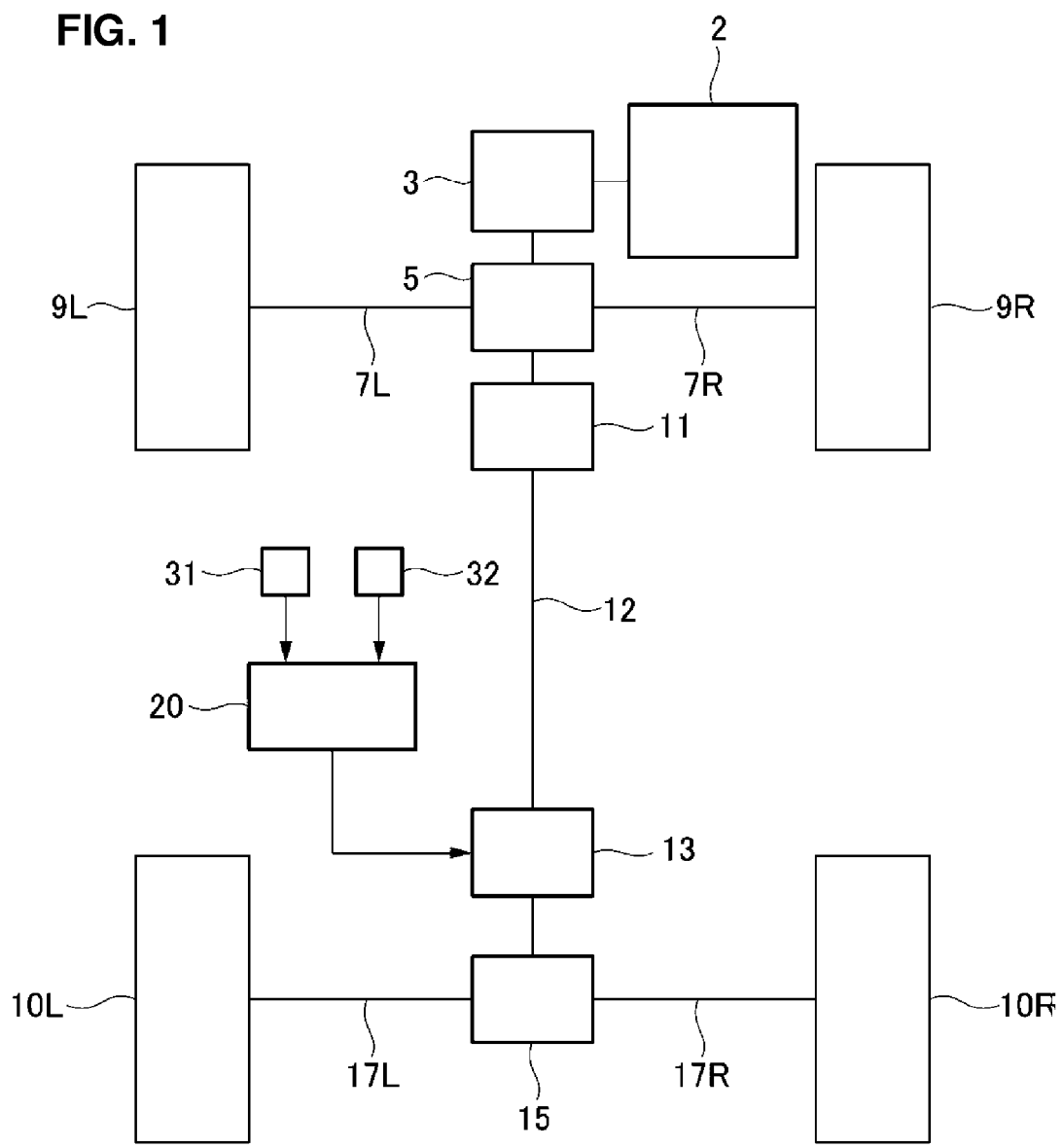
FIG. 1 is an entire structural diagram schematically showing a vehicle, to which a driving-torque distribution control apparatus of a four-wheel drive vehicle according to an embodiment of the present invention is applied.

As shown in FIG. 1, a vehicle 1 mainly comprises an engine 2, a transmission 3, a front differential device 5, front drive shafts 7R, 7L, a pair of right-and-left front wheels 9 (a right front wheel 9R and a left front wheel 9L), a pair of right-and-left rear wheels 10 (a right rear wheel 10R and a left rear wheel 10L), a transfer 11, a propeller shaft 12, a driving-torque transmission device 13 (capable of adjusting a driving torque transmitted to the rear wheels 10), a rear differential device 15, rear drive shafts 17R, 17L, a controller 20, a lateral-acceleration sensor 31, and a yaw-rate sensor 32.

The vehicle 1 is a four-wheel drive vehicle which is a front-engine front-drive type (FF type). Specifically, the vehicle 1 is configured not to perform a full-time typed four-wheel driving, but to switch between a two-wheel driving state (only the front wheels 9 are driven) and a four-wheel driving state (both the front wheels 9 and the rear wheels 10 are driven) suitably. The vehicle 1 is further configured to steer the front wheels 9 according to an operation of a steering wheel, not illustrated.

The engine 2 generates a driving torque (an engine's output torque) as a driving force to move the vehicle 1 through the combustion of fuel and air, and transmits the driving torque to the transmission 3. The transmission 3 is capable of changing a gear ratio at plural stages, and transmits the driving torque from the engine 2 with a specified set gear ratio. The front differential device 5 distributes the driving torque transmitted from the transmission 3 to the right front wheel 9R and the left front wheel 9L via the front drive shafts 7R, 7L. The transfer 11 transmits the driving torque transmitted via the front differential device 5 to the propeller shaft 12, which transmits the driving torque transmitted from the transfer 11 to the driving-torque transmission device 13. The driving-torque transmission device 13 transmits the driving torque transmitted via the propeller shaft 12 to the rear differentia device 15, which transmits the driving torque transmitted from the driving-torque transmission device 13 to the right rear wheel 10R and the left rear wheel 10L via the rear drive shafts 17R, 17L.

More specifically, the driving-torque transmission device 13 comprises a coupling (not illustrated specifically) which couples the propeller shaft 12 and a shaft connected to the rear differential device 15 and others, and is configured to vary a connecting torque of this coupling so as to adjust the driving torque transmitted to the rear wheels 10 under the performance of the controller 20. The driving-torque transmission device 13 is configured to vary a maximum transmission driving torque which is the maximum of the driving torque transmitted to the rear differential device 15 (i.e., the driving torque transmitted to the rear wheels 10) by changing the coupling torque of the coupling. Herein, the maximum transmission driving torque is set by the controller 20, and the driving-torque transmission device 13 transmits the driving torque corresponding to this maximum transmission driving torque to the rear differential device 15. Specifically, when the driving torque transmitted via the propeller shaft 12 is equal to or less than the maximum transmission driving torque, the driving-torque transmission device 13 transmits this driving torque to the rear differential device 15. Meanwhile, when the driving torque transmitted via the propeller shaft 12 is more than the maximum transmission driving torque, the driving-torque transmission device 13 does not transmit all of this transmitted driving torque to the rear differential device 15 but transmits only the driving torque corresponding to (equal to) the maximum transmission driving torque to the rear differential device 15. Herein, the driving-torque transmission device 13 may adopt the structure disclosed in the above-described third patent document, for example. However, the present invention is not limited to the structure in which the driving torque is distributed to the rear wheels 10 by using the above-described driving-torque transmission device 13, and the driving torque may be distributed to the rear wheels 10 by using any other known device.

Figure 2:
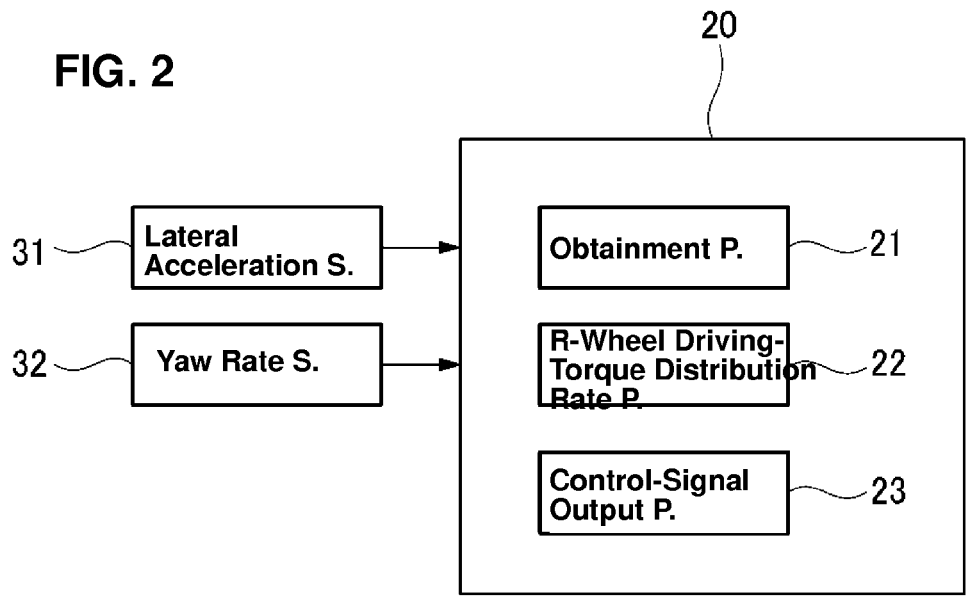
FIG. 2 is a functional diagram of a controller according to the embodiment of the present invention.

FIG. 2 is a functional diagram of the controller 20 according to the embodiment of the present invention. As shown in FIG. 2, the controller 20 functionally comprises an obtainment portion 21, a rear-wheel driving-torque distribution rate determination portion 22, and a control-signal output portion 23.

The obtainment portion 21 of the controller 20 obtains a lateral acceleration generated at the vehicle 1 which is detected by the lateral-acceleration sensor 31, a yaw rate generated at the vehicle 1 which is detected by the yaw-rate sensor 32, and an engine torque which the engine 2 outputs. Herein, the obtainment portion 21 obtains a turning radius of the vehicle 1 based on the yaw rate detected by the yaw-rate sensor 32. The present invention is not limited to obtaining the vehicle's turning radius based on the yaw rate. Alternatively, the vehicle's turning radius may be obtained based on a radius of curvature of a vehicle's traveling road which is informed from map data (road data) of a navigation device. Further, a white line put on the vehicle's traveling road may be detected from an image photographed by an onboard camera, the radius of curvature of the vehicle's traveling road may be obtained based on the detected white line, and the vehicle's turning radius may be obtained based on this radius of curvature.

The rear-wheel driving-torque distribution rate determination portion 22 of the controller 20 determines the rear-wheel driving-torque distribution rate which denotes the rate of the driving torque distributed to the rear wheels 10 relative to the driving torque corresponding to the output torque of the engine 2, i.e., the rate of the driving torque transmitted to the rear wheels 10 relative to the total driving torque applied to the vehicle 1, based on the lateral acceleration, the turning radius, and the engine torque which are obtained by the obtainment portion 21 during the turning of the vehicle 1.

The control-signal output portion 23 of the controller 20 outputs a control signal to the driving-torque transmission device 13 so that the driving torque to be distributed to the rear wheels 10 can be adjusted according to the rear-wheel driving-torque distribution rate determined by the rear-wheel driving-torque distribution rate determination portion 22. Specifically, the control-signal output portion 23 is configured to obtain the maximum transmission driving torque to be set by the driving-torque transmission device 13 based on the rear-wheel driving-torque distribution rate, and control the driving-torque transmission device 13 such that this device 13 sets the maximum transmission driving torque, so that the desired driving torque can be transmitted to the rear wheels 10.

Herein, the controller 20 is a computer comprising CPU which is operated by various kinds of program (including a basic control program, such as OS, and application programs) and internal memories, such as ROM and RAM, to store the programs and various data. The controller 20 is made of an ECU (Electric Control Unit), for example.

[Basic Concept]

Next, a basic concept of a distribution control method of the driving torque which is executed by the above-described controller 20 according to the embodiment of the present invention will be described.

In the present embodiment, the energy loss caused by the resistance which is generated at the vehicle 1 entirely, including the front wheels 9 and the rear wheels 10, during the turning of the vehicle 1 may be defined as the total sum of the sum of tire-loss energy of the front and rear wheels 9, 10 and mechanism-loss energy caused by driving of the rear wheels 10. Further, in the present embodiment, the driving-torque distribution rate determination portion 22 of the controller 20 determines the rear-wheel driving-torque distribution rate such that the total sum of the loss energy becomes the minimum, and the control-signal output portion 23 of the controller 20 outputs the control signal to the driving-torque transmission device 13 such that the driving torque distributed to the rear wheels 10 is controlled according to the determined rear-wheel driving-torque distribution rate.

The "tire-loss energy" corresponds to the loss energy caused by the cornering resistance of the vehicle's tire. The tire-loss energy increases as the lateral acceleration of the vehicle 1 becomes greater, and the tire-loss energy increases as the turning radius of the vehicle 1 becomes smaller. For example, the tire-loss energy is loss energy equivalent to a cornering resistance force (i.e., a force generated in an opposite direction to an actual running direction of the tire) which corresponds to a lateral force acting on the tire, an actual steering angle, and a slip angle of the tire. In an example, the tire loss energy may be obtained by time-integrating a product of the cornering resistance force and a tire longitudinal speed (a speed in the actual running direction of the tire).

Meanwhile, the "mechanical-loss energy" is the mechanical-loss energy in the vehicle 1 which is caused by driving of the rear wheels 10. For example, the mechanical-loss energy includes the loss energy for driving the propeller shaft 12, the loss energy caused by a differential motion at the rear differential device 15, and so on. The mechanical-loss energy increases as the engine torque outputted by the engine 2 becomes greater, and the mechanical-loss energy increases as the turning radius of the vehicle 1 becomes smaller. Herein, specifically speaking, the mechanical-loss energy includes not only loss energy relating to the driving of the rear wheels 10 but also loss energy relating to the front wheels 9. However, since the mechanical-loss energy relating to the driving of the rear wheels 10 is dominant, the loss energy relating to the driving of the rear wheels 10 will be treated as the mechanical-loss energy in this description.

Figure 3:
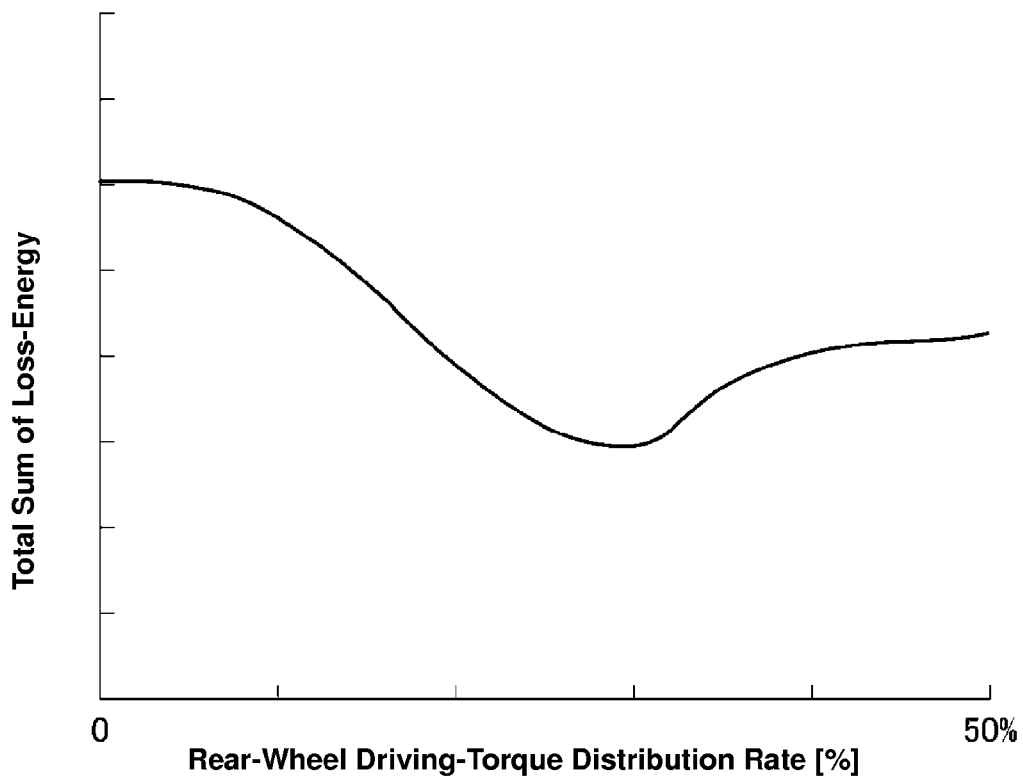
FIG. 3 shows an example of relationships of a rear-wheel driving-torque distribution rate and the total sum of loss energy in a case in which the vehicle turns at a constant speed on a road having a regular circle.

Next, changing of the total sum of the loss energy generated during the vehicle's turning according to the rear-wheel driving-torque distribution rate will be descried referring to FIG. 3.

FIG. 3 shows an example of the total sum of loss energy of the sum of the tire-loss energy of the front and rear wheels 9, 10 and the mechanical-loss energy in a case in which the vehicle turns at a constant speed on a road having a regular circle having a constant turning radius (in other words, the engine output required to maintain the constant speed when turning on the road having the regular circle). In FIG. 3, the abscissa represents the rear-wheel driving-torque distribution rate (%), and the ordinate represents the total sum of the loss energy (corresponding to the engine output).

As shown in FIG. 3, the total sum of the loss energy is rather large in a case in which the rear-wheel driving-torque distribution rate is around 0% (i.e., in a front-wheel driving state or in a state close to this state), the total sum of the loss energy is the minimum in a case in which the rear-wheel driving-torque distribution rate is around 30%, and the total sum of the loss energy is larger than that of the case of being around 30% in a case in which the rear-wheel driving-torque distribution rate is 50%. Accordingly, it is understood that there exits the rear-wheel driving-torque distribution rate which causes the minimum of the total sum of the loss energy of the tire-loss energy and the mechanical-loss energy. That is, the total sum of the loss energy becomes the minimum by setting the rear-wheel driving-torque distribution rate at a specified proper value (or within a specified proper range).

Next, the reason for the total sum of the loss energy changing according to the rear-wheel driving-torque distribution rate will be considered referring to FIG. 4.

Figure 4A:
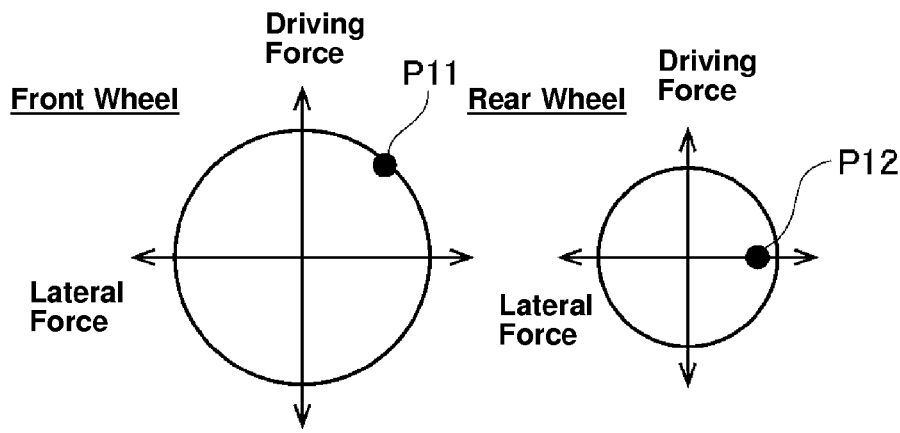
FIGS. 4A, 4B and 4C show friction circles indicating forces acting on front and rear wheels in a longitudinal direction and forces acting on the front and rear wheels in a lateral direction, respectively.
Figure 4B:
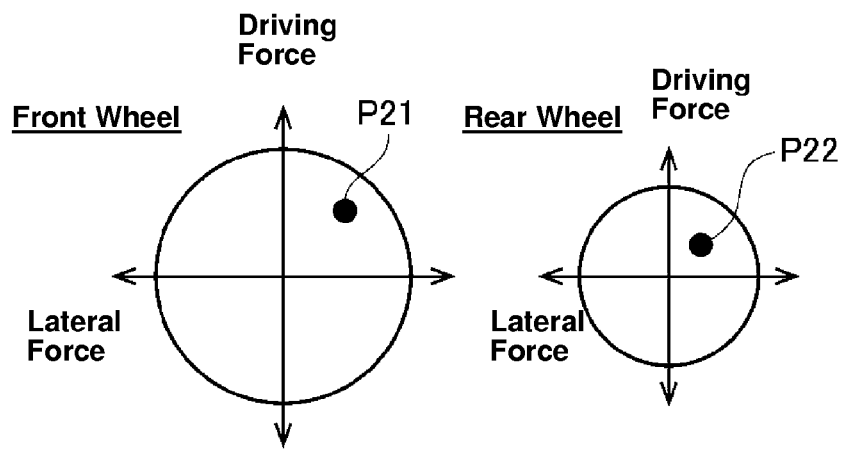
Figure 4C:
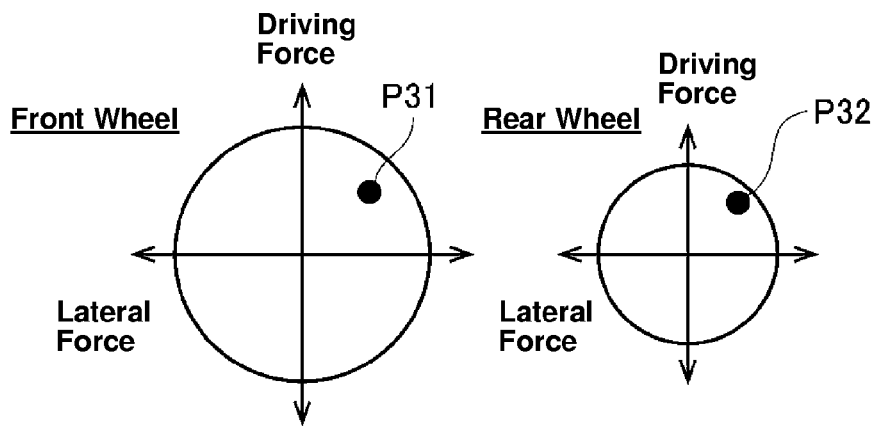

FIGS. 4A, 4B and 4C show forces acting on the front and rear wheels 9, 10 for each rear-wheel driving-torque distribution rate in the case in which the vehicle 1 turns at the constant speed on the road having the regular circle, similarly to FIG. 3. Specifically, FIGS. 4A, 4B and 4C show friction circles for the front and rear wheels 9, 10, and show, by using these friction circles, forces acting on the front and rear wheels 9, 10 in a longitudinal direction (a driving force/a longitudinal force) and forces acting on the front and rear wheels 9, 10 in a lateral direction (a lateral force), respectively. FIG. 4A shows a case in which the rear-wheel driving-torque distribution rate is 0% (i.e., a front-wheel driving state), FIG. 4B shows a case in which the rear-wheel driving-torque distribution rate is 35% (i.e., a state of the front-rear distribution rate of the driving torque being 65:35), and FIG. 4C shows a case in which the rear-wheel driving-torque distribution rate is 50% (i.e., a state of the front-rear distribution rate of the driving torque being 50:50). Herein, the size of the friction circle of the rear wheel 10 is smaller than that of the front wheel 9 because the engine 1 is arranged at a front side of the vehicle 1 (see FIG. 1) and therefore the gravity center of the vehicle 1 is located forward, so that a gripping limit of the tire of the front wheel 9 is greater than that of the tire of the rear wheel 10.

As shown in FIG. 4A, in the case in which the rear-wheel driving-torque distribution rate is 0%, the force denoted by reference character P11 acts on the front wheel 9, and the force denoted by reference character P12 acts on the rear wheel 10. In this case, while mechanical-loss energy is basically about 0 (zero), the driving force (driving torque) applied to the front wheel 9 is so large that the tire-loss energy of the front wheel 9 becomes rather large. Accordingly, as shown in FIG. 3, the total sum of the tire-loss energy of the front and rear wheels 9, 10 and the mechanical-loss energy becomes rather large.

Meanwhile, as shown in FIG. 4B, in the case in which the rear-wheel driving-torque distribution rate is 35%, the force denoted by reference character P21 acts on the front wheel 9, and the force denoted by reference character P22 acts on the rear wheel 10. As shown in FIG. 4C, in the case in which the rear-wheel driving-torque distribution rate is 50%, the force denoted by reference character P31 acts on the front wheel 9, and the force denoted by reference character P32 acts on the rear wheel 10. In comparison of the two cases of the rear-wheel driving-torque distribution rates of 35% and 50%, the sum of tire-loss energy of the front and rear wheels 9, 10 of the 35% case is relatively large, compared to the 50% case (i.e., the sum of the tire-loss energy of the 35% case is not the minimum). However, the driving force (driving torque) transmitted to the rear wheel 10 of the 35% case is relatively small, compared to the 50% case, so that the mechanical-loss energy of the 35% case is relatively small. Herein, the difference in the mechanical-loss energy between the 35% case and the 50% case is larger than that in the tire-loss energy between the 35% case and the 50% case. Accordingly, as shown in FIG. 3, the total sum of the tire-loss energy of the front and rear wheels 9, 10 and the mechanical-loss energy of the 35% case is smaller than that of the 50% case. That is, the total sum of loss energy becomes about the minimum in the case in which the rear-wheel driving-torque distribution rate is 35%.

As described above, according to the present embodiment, the driving torque distributed to the rear wheel 10 is controlled according to various parameters during the vehicle's turning such that the total sum of the loss energy of the tire-loss energy and the mechanical-loss energy becomes the minimum. This control of the driving torque distributed to the rear wheel 10 is equivalent to a control which is performed such that the forces positioned inside the friction circles of the front wheel 9 and the rear wheel 10, not the forces positioned on the friction circles of the front wheel 9 and the rear wheel 10, act on the front and rear wheels 9, 10. Specifically, the above-described control is equivalent to equalizing works of the four wheels 9R, 9L, 10R, 10L of the four-wheel drive vehicle, in other words, equivalent to equalizing tire's powers (work rates) of the four wheels 9R, 9L, 10R, 10L with the total sum considering both the longitudinal force and the lateral force.

Herein, as shown in FIGS. 3 and 4, a situation in which the total sum of the loss energy becomes the minimum in the case of the rear-wheel driving-torque distribution rate being about 35% occurs only in a certain traveling scene, and therefore the total sum of the loss energy does not become the minimum all the time in the case in which the rear-wheel driving-torque distribution rate is about 35%. The rear-wheel driving-torque distribution rate which minimizes the total sum of the loss energy changes according to the traveling scene.

[Control Method]

Next, the distribution control method of the driving torque which is executed by the above-described controller 20 in the embodiment of the present invention will be described specifically.

In the present embodiment, the driving-torque distribution rate determination portion 22 of the controller 20 determines the rear-wheel driving-torque distribution rate based on the parameters which have an influence on the total sum of the loss energy of the sum of the tire-loss energy of the front and rear wheels 9, 10 and the mechanical-loss energy during the vehicle's turning such that the total sum of the loss energy becomes the minimum. Specifically, since the lateral acceleration generated at the vehicle 1, the engine's output torque, and the vehicle's turning radius during the vehicle's tuning may have the influence on the total sum of the sum of tire-loss energy of the front and rear wheels and the mechanism-loss energy during the vehicle's turning, that is, the total sum of the loss energy changes according to the lateral acceleration, the engine's output torque, and the vehicle's turning radius, the driving-torque distribution rate determination portion 22 determines the rear-wheel driving-torque distribution rate based on the lateral acceleration, the engine's output torque, and the vehicle's turning radius. For example, the driving-torque distribution rate determination portion 22 determines the rear-wheel driving-torque distribution rate such that the greater the vehicle's lateral acceleration is, the larger the rear-wheel driving-torque distribution rate is, such that the greater the engine's output torque is, the larger the rear-wheel driving-torque distribution rate is, or such that the greater the vehicle's turning radius is, the smaller the rear-wheel driving-torque distribution rate is.

Hereafter, the changing of the total sum of the loss energy according to the lateral acceleration, the engine's output torque, and the vehicle's turning radius will be described specifically referring to FIGS. 5A, B.

FIG. 5A schematically shows characteristics of the tire-loss energy (the ordinate) according to the vehicle's turning radius (the abscissa). Specifically, a graph showing relationships of the vehicle's turning radius and the tire-loss energy is indicated for plural lateral accelerations in FIG. 5A. As shown in FIG. 5A, the tire-loss energy increases as the turning radius of the vehicle 1 becomes smaller, and also the tire-loss energy increases as the lateral acceleration becomes larger. Herein, since the lateral acceleration generated at the vehicle 1 depends on the vehicle speed (depending on the turning radius of the vehicle as well), a situation in which the tire-loss energy increases as the lateral acceleration becomes larger is almost equivalent to a situation in which the tire-loss energy increases as the vehicle speed becomes larger.

FIG. 5B schematically shows characteristics of the mechanical-loss energy (the ordinate) according to the engine's output torque (the abscissa). The engine's output torque is equivalent to the total sum of the driving torque applied to the four wheels 9R, 9L, 10R, 10L. Specifically, a graph showing relationships of the engine's output torque and the mechanical-loss energy is indicated for plural turning radiuses in FIG. 5B. As shown in FIG. 5B, the mechanical-loss energy increases as the engine's output torque becomes greater, and also the mechanical-loss energy increases as the turning radius becomes smaller. The reason the mechanical-loss energy increases as the turning radius becomes smaller is that when the turning radius becomes small, the difference in the rotational speed between the right rear wheel 10R and the left rear wheel 10L becomes greater, so that the resistance caused by the differential motion of the rear differential device 15 increases.

It is apparent, from the characteristics shown in FIG. 5A indicating that the tire-loss energy changes according to the turning radius and the lateral acceleration and the characteristics shown in FIG. 5B indicating that the mechanical-loss energy changes according to the engine's output torque and the turning radius, that the total sum of the tire-loss energy and the mechanical-loss energy also changes according to the lateral acceleration, the engine's output torque, and the turning radius. Specifically, there are tendencies that the total sum of the loss energy increases as the lateral acceleration becomes greater, the total sum of the loss energy increases as the engine's output torque becomes greater, and the total sum of the loss energy increases as the turning radius becomes smaller.

In the present embodiment, a map (table) of the rear-wheel driving-torque distribution rate which provides the minimum total sum of the loss energy has been previously determined based on the lateral acceleration, the engine's output torque, and the vehicle's turning radius from the characteristics shown in FIGS. 5A and 5B, and the driving-torque distribution rate determination portion 22 of the controller 20 determines, referring this map, the rear-wheel driving-torque distribution rate which correspond to the lateral acceleration, the engine's output torque, and the vehicle's turning radius which are currently obtained by the obtainment portion 21 of the controller 20.

In one example, the rear-wheel driving-torque distribution rate providing the minimum total sum of the loss energy is obtained for each combination with the lateral acceleration, the engine's output torque, and the vehicle's turning radius by obtaining the total sum of the loss energy in combination with the lateral acceleration, the engine's output torque, and the vehicle's turning radius. A four-dimension map of the rear-wheel driving-torque distribution rate to be set which is determined by the lateral acceleration, the engine's output torque, and the vehicle's turning radius (the rear-wheel driving-torque distribution rate providing the minimum total sum of the loss energy) is created thereby. Then, the rear-wheel driving-torque distribution rate determination portion 22 of the controller 20 determines, referring this four-dimension map, the rear-wheel driving-torque distribution rate which corresponds to the lateral acceleration, the engine's output torque, and the vehicle's turning radius which are currently obtained by the obtainment portion 21 of the controller 20.

In another example, a value which is calculated by multiplying the lateral acceleration, the engine's output torque, and the reciprocal of the vehicle's turning radius (hereafter, referred to as "multiplication value") is used. That is, the rear-wheel driving-torque distribution rate providing the minimum total sum of the loss energy is obtained for each multiplication value by obtaining the total sum of the loss energy of the multiplication value for each rear-wheel driving-torque distribution rate. A two-dimension map of the rear-wheel driving-torque distribution rate to be set which is determined by the multiplication value (the rear-wheel driving-torque distribution rate providing the minimum total sum of the loss energy) is created thereby. Then, the rear-wheel driving-torque distribution rate determination portion 22 of the controller 20 determines, referring this two-dimension map, the rear-wheel driving-torque distribution rate which corresponds to the multiplication value obtained from the lateral acceleration, the engine's output torque, and the vehicle's turning radius which are currently obtained by the obtainment portion 21 of the controller 20.

FIG. 6 shows a map for determining the rear-wheel driving-torque distribution rate according to the embodiment of the present invention. Specifically, FIG. 6 shows an example of the map of the rear-wheel driving-torque distribution rate which is determined by the multiplication value which is calculated by multiplying the lateral acceleration, the engine's output torque, and the reciprocal of the vehicle's turning radius. In FIG. 6, the abscissa represents the multiplication value which is calculated by multiplying the lateral acceleration, the engine's output torque, and the reciprocal of the vehicle's turning radius, and the ordinate represents the rear-wheel driving-torque distribution rate.

The rear-wheel driving-torque distribution rate determination portion 22 of the controller 20 determines the multiplication value from the lateral acceleration, the engine's output torque, and the vehicle's turning radius which are currently obtained by the obtainment portion 21 of the controller 20, and determines the rear-wheel driving-torque distribution rate which corresponds to the determined multiplication value referring to the map of FIG. 6 (see an arrow A1). Then, the control-signal output portion 23 of the controller 20 outputs the control signal to the driving-torque transmission device 13 such that the driving torque to be distributed to the rear wheels 10 is adjusted according to the rear-wheel driving-torque distribution rate determined by the rear-wheel driving-torque distribution rate determination portion 22.

[Operation Effect]

Lastly, an operation and effect of the driving-torque distribution control apparatus of the four-drive vehicle according to the embodiment of the present invention will be descried.

According to the present embodiment, the rear-wheel driving-torque distribution rate is determined based on the lateral acceleration, the engine's output torque, and the vehicle's turning radius, which may have the influence on the total sum of the sum of tire-loss energy of the front and rear wheels 9, 10 and the mechanism-loss energy during the vehicle's turning, and then the driving torque distributed to the rear wheel 10 is controlled. Thereby, the total sum of the loss energy can be properly minimized. Accordingly, the vehicle can turn the curve efficiently. That is, the turning locus (track) of the vehicle can approach the neutral steering (N/S). Additionally, the tire wear at the vehicle's turning can be properly prevented.

The present invention should not be limited to the above-described embodiment, and any other modifications or improvements may be applied within the scope of a spirit of the present invention.

What is claimed is:

1. A driving-torque distribution control apparatus of a four-wheel drive vehicle, which comprises a controller and a driving-torque transmission device to adjust a driving torque transmitted to a rear wheel according to a control signal of the controller, thereby controlling a driving-torque distribution of front and rear wheels of the vehicle, wherein said controller is configured to:

obtain a lateral acceleration generated at the vehicle, an engine's output torque, and a vehicle's turning radius during turning of the vehicle;

determine a rear-wheel driving-torque distribution rate which denotes a rate of the driving torque to be transmitted to the rear wheel relative to the driving torque corresponding to the engine's output torque based on said obtained vehicle's lateral acceleration, engine's output torque, and vehicle's turning radius; and output the control signal to said driving-torque transmission device such that the driving torque to be distributed to the rear wheel is controlled according to said determined rear-wheel driving-torque distribution rate.

2. The driving-torque distribution control apparatus of the four-wheel drive vehicle of claim 1, wherein said controller determines the rear-wheel driving-torque distribution rate based on the obtained vehicle's lateral acceleration, engine's output torque, and vehicle's turning radius such that the total sum of loss energy of the sum of tire-loss energy of the front and rear wheels and mechanism-loss energy caused by driving of the rear wheel becomes the minimum.

3. The driving-torque distribution control apparatus of the four-wheel drive vehicle of claim 1, wherein said controller determines the rear-wheel driving-torque distribution rate such that the greater said obtained vehicle's lateral acceleration is, the larger the rear-wheel driving-torque distribution rate is.

4. The driving-torque distribution control apparatus of the four-wheel drive vehicle of claim 1, wherein said controller determines the rear-wheel driving-torque distribution rate such that the greater said obtained engine's output torque is, the larger the rear-wheel driving-torque distribution rate is.

5. The driving-torque distribution control apparatus of the four-wheel drive vehicle of claim 1, wherein said controller determines the rear-wheel driving-torque distribution rate such that the greater said obtained vehicle's turning radius is, the smaller the rear-wheel driving-torque distribution rate is.

6. The driving-torque distribution control apparatus of the four-wheel drive vehicle of claim 1, wherein said controller determines the rear-wheel driving-torque distribution rate such that the greater said obtained vehicle's lateral acceleration is, the larger the rear-wheel driving-torque distribution rate is, and/or the greater said obtained engine's output torque is, the larger the rear-wheel driving-torque distribution rate is, and/or the greater said obtained vehicle's turning radius is, the smaller the rear-wheel driving-torque distribution rate is.

7. The driving-torque distribution control apparatus of the four-wheel drive vehicle of claim 1, wherein said controller determines the rear-wheel driving-torque distribution rate based on a map which previously associates the rear-wheel driving-torque distribution rate to be set with a value which is calculated by multiplying the lateral acceleration, the engine's output torque, and the reciprocal of the vehicle's turning radius, the rear-wheel driving-torque distribution rate determined by the controller being configured to correspond to the value calculated by multiplying the obtained lateral acceleration, the obtained engine's output torque, and the reciprocal of the obtained vehicle's turning radius.

8. The driving-torque distribution control apparatus of the four-wheel drive vehicle of claim 1, wherein said controller determines the rear-wheel driving-torque distribution rate based on a map which previously associates the rear-wheel driving-torque distribution rate to be set with a combination of the lateral acceleration, the engine's output torque, and the vehicle's turning radius, the rear-wheel driving-torque distribution rate determined by the controller being configured to correspond to the combination of the obtained lateral acceleration, the obtained engine's output torque, and the obtained vehicle's turning radius.

9. The driving-torque distribution control apparatus of the four-wheel drive vehicle of claim 1, wherein said driving-torque transmission device is configured to vary a maximum transmission driving torque which is the maximum of the driving torque transmitted to the rear wheel, and said controller obtains said maximum transmission driving torque based on said rear-wheel driving-torque distribution rate and sets the obtained maximum transmission driving torque for the driving-torque transmission device.

* * * * *